US008435314B2

(12) United States Patent
Ruiters

(10) Patent No.: US 8,435,314 B2
(45) Date of Patent: *May 7, 2013

(54) METHOD FOR THE PREPARATION OF SOLID FUELS BY MEANS OF TORREFACTION AS WELL AS THE SOLID FUELS THUS OBTAINED AND THE USE OF THESE FUELS

(75) Inventor: Gerard Hubert Joseph Ruiters, Maaseik-Neeroeteren (BE)

(73) Assignee: Torr-Coal Technology, B.V., Munstergeleen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,882

(22) Filed: Jul. 6, 2012

(65) Prior Publication Data

US 2012/0279115 A1 Nov. 8, 2012

Related U.S. Application Data

(62) Division of application No. 12/304,571, filed as application No. PCT/NL2007/000148 on Jun. 14, 2007, now Pat. No. 8,231,696.

(30) Foreign Application Priority Data

Jun. 14, 2006 (NL) .................................... 1032001
Jul. 24, 2006 (NL) .................................... 1032226

(51) Int. Cl.
*C10L 5/00* (2006.01)
*C10L 5/46* (2006.01)
*C10L 5/48* (2006.01)

(52) U.S. Cl.
USPC ............................ 44/605; 44/500; 44/505

(58) Field of Classification Search .................. 44/500, 44/505, 605
See application file for complete search history.

(56) References Cited

U.S. PATENT DOCUMENTS 4,787,917 A 11/1988 Leclerc de Bussy ........... 44/606
6,178,899 B1 1/2001 Kaneko et al. ................ 110/346
(Continued)

FOREIGN PATENT DOCUMENTS

FR 2 624 876 6/1989
WO WO 83/00046 1/1983
(Continued)

OTHER PUBLICATIONS

Arcate, James R. "Global Markets and Technologies For Torrefied Wood in 2002." Wood Energy, Jul. 2002, pp. 26-28.
(Continued)

*Primary Examiner* — Cephia D Toomer
*Assistant Examiner* — Vishal Vasisth
(74) *Attorney, Agent, or Firm* — Roberts & Roberts, LLP

(57) ABSTRACT

The present application relates to a method for the preparation, by torrefaction, of a solid fuel wherein a starting composition is heated indirectly. The present invention also relates to a solid fuel to be obtained by such method. The present application further relates to a method for the removal of one or more metals from or the reduction of the "total chlorine content", the sulphur content and the trace element content of a solid fuel thus obtained. In addition to that, the present invention relates to a solid fuel, which can be obtained by the carrying out of such a method. Finally, the present invention relates to the uses of such solid fuels.

21 Claims, 1 Drawing Sheet

U.S. PATENT DOCUMENTS

| | | | |
|---|---|---|---|
| 6,558,644 B1 * | 5/2003 | Berman | 423/445 R |
| 2002/0189510 A1 | 12/2002 | Kashiwagi | 110/342 |
| 2003/0140559 A1 * | 7/2003 | Krumm et al. | 48/77 |
| 2003/0221363 A1 | 12/2003 | Reed | 44/594 |
| 2008/0006034 A1 | 1/2008 | Cerroni | 60/780 |

FOREIGN PATENT DOCUMENTS

| | | |
|---|---|---|
| WO | WO 86/06930 | 12/1986 |
| WO | WO 91/11499 | 8/1991 |
| WO | WO2005/049530 | 6/2005 |
| WO | WO2005/056723 | 6/2005 |
| WO | WO2005/123285 | 12/2005 |

OTHER PUBLICATIONS

Marongiu, Alessandro, et al. "Detailed Kinetic Modeling of the Thermal Degradation of Vinyl Polymers." Journal of Analytical and Applied Pyrolysis, part 78, No. 2, pp. 343-362, 2007.

Faravelli, Tiziano, et al. "Detailed Kinetic Modeling of Thermal Degradation of Plastics." CMIC—Dipartimento di Chimica, Materiali e Ingegneria Chimica, Politeenico di Milano, P.za L. da Vinci 32, Milano (Italy), 1999, pp. B2-1-B-2-22.

* cited by examiner

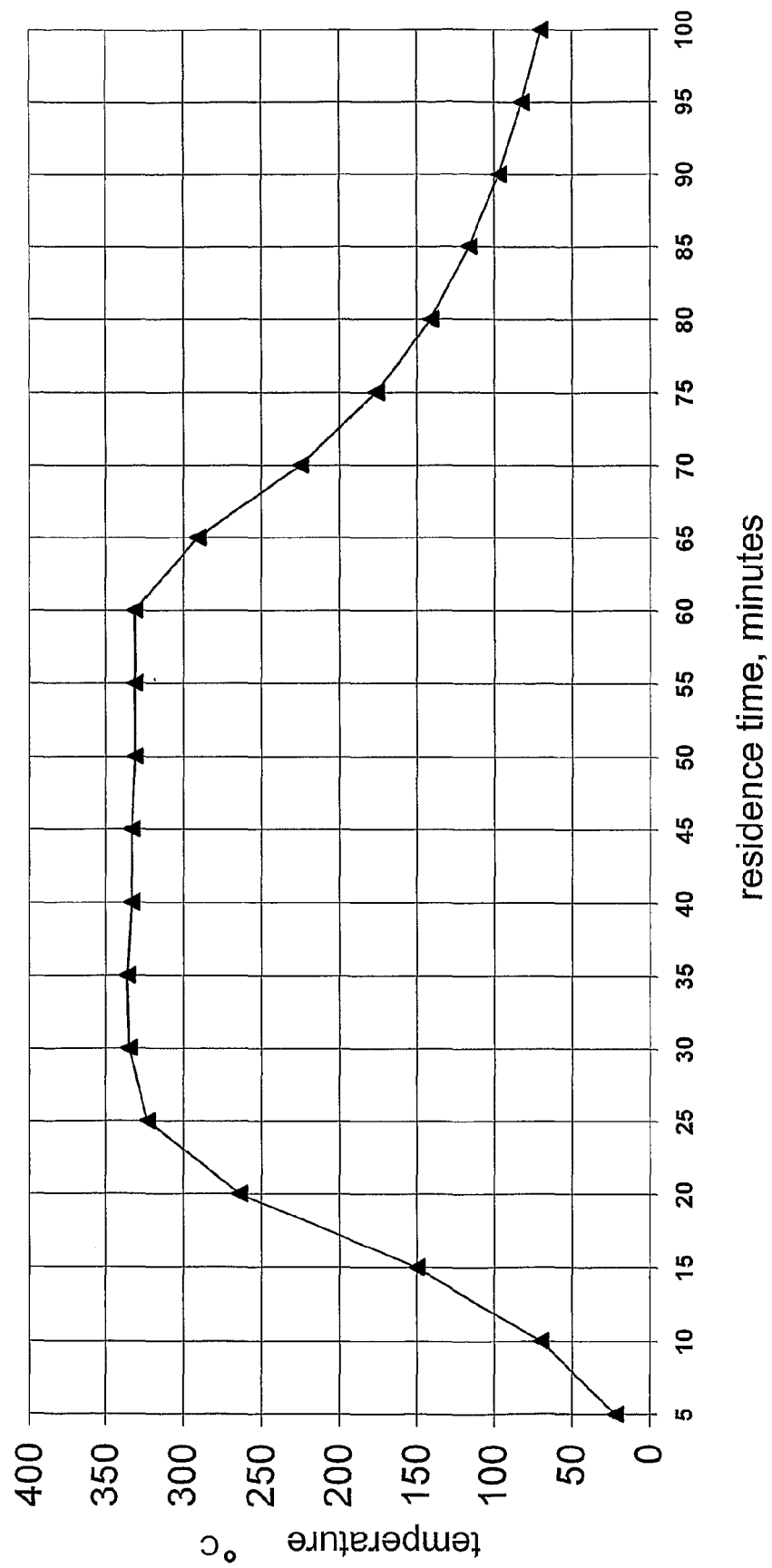

METHOD FOR THE PREPARATION OF SOLID FUELS BY MEANS OF TORREFACTION AS WELL AS THE SOLID FUELS THUS OBTAINED AND THE USE OF THESE FUELS

CROSS REFERENCE TO RELATED APPLICATIONS

This application is a divisional of U.S. application Ser. No. 12/304,571, now U.S. Pat. No. 8,231,696, filed on Feb. 20, 2009 as a U.S. national phase entry of International Appln. No. PCT/NL2007/000148 filed on Jun. 14, 2007. Priority is claimed from Netherlands Patent Application No. NL1032001 filed on Jun. 14, 2006; and Netherlands Patent Application No. NL 1032226 filed on Jul. 24, 2006, both of which are incorporated herein by reference.

The present invention relates to a method for the preparation of a solid fuel by means of torrefaction wherein a starting composition is heated indirectly and to a solid fuel obtained by such method. Furthermore, the present invention relates to a number of methods for the improvement of the obtained solid fuel. That is, the present invention also relates to a method for removing one or more metals from a solid fuel and to a solid fuel obtained by such method. The present intention also relates to a method for decreasing "total chlorine level" of a solid fuel and to a solid fuel obtained by such method. Finally, the present invention relates to the use of the present solid fuels.

Methods for the preparation of a solid fuel by indirect heating of a composition are for example described in WO 2005/056723 and US 2003/0221363. In such methods, woody products such as, for example, wood chips, saw dust or, for example, nut shells, are torrefied, yielding a solid fuel.

The problem with such known methods is that woody products are necessary as starting material to yield a solid fuel. This has a number of disadvantages.

Firstly, wood and woody products are natural materials of which the supply quantity cannot be controlled in a simple manner. In many countries, such as the Netherlands, no large-scale wood production is conducted because of the limited surface area available. As a result, it has turned out to be impossible to produce a stable, continuous quantity of wood for the purpose of energy production. If there is (temporarily) a limited supply of wood, for example a seasonal supply, at a constant energy requirement, the need to import wood will develop in order to be able to continue to meet the energy requirement. Wood can for instance be purchased from countries with a large-scale and more continuous production of wood, such as, for example, Finland, the Baltic states and Canada. The fuel production by application of the above method according to the prior art depends on purchasing from other countries, which is undesirable.

A second disadvantage of using wood as a starting material is the purchase price of the starting material. Wood is a costly product as it is also applicable for other purposes, such as, for example, the furniture and paper industries. Furthermore, the costs will rise further if the limited wood supplies need to be drawn on for energy production. The associated costs do not only relate to the purchase of the wood material but also to the costs of transporting it. Thus, a solid fuel based on wood, would show a significant and possibly even fluctuating price, which is undesirable.

A third disadvantage of applying the methods according to the prior art is environmental in nature. If wood needs to be transported, for example from other countries, this will lead to pollution as a result of the utilization of means of transportation, which is undesirable. In addition it is undesirable to use as a fuel a raw material that can also be used for other purposes than fuel. Furthermore, a product that is formed by torrefaction of wood contains a certain degree of fine dust, which may lead to problems during storage and transport.

Other biomass streams, such as, for example, straw, which also might be used as fuel for energy production, have physical and chemical properties that also limit their large-scale use.

By "torrefying" of "torrefaction" a process is meant in which a starting material is subjected to a certain heat treatment. The term torrefaction is usually used for processes to improve the properties of biomass, such as, for example, the roasting of coffee beans or the burning of biomass such as described in various publications of the Energie Centrum Nederland (ECN). During the torrefaction process, the biomass is slowly heated in an inert atmosphere, that is, an (essentially) oxygen-free atmosphere. The torrefaction treatment leads to a solid product with a lower moisture content and a higher energy density than the starting material. The torrefaction process could also be denoted as "mild pyrolysis" in which organic compounds are partially degraded and flammable gases are formed. Approximately 70% of the initial weight based on dry matter and approximately 90% of the initial energy are retained, which raises the caloric value per unit of weight.

If biomass is torrefied, this yields so-called torrefied biomass, which possesses a number of special properties. The first property is hydrophobicity; the material loses its natural property of moisture absorption and biological degradability and is therefore more stable during storage than hydrophilic, non-torrefied biomass (such as, for example, wood and straw). In addition, there is less smoke formation when torrefied biomass is burned, compared with when non-torrefied biomass is burned.

According to European legislation and regulations, "pure biomass" is formed by a stream in which the proportion of biomass is greater than 97% of the dry weight. Streams with a biomass proportion of less than 97% are indicated as "impure biomass". At least 3% other substances, for example plastics, are then present. This is for example the case with biomass that originates from compostation installations, in the case of screen overflow. The term biomass is understood to mean a material that directly or indirectly originates from plant material.

Biomass for fuel purposes has increasingly gained attention in recent years. This has two reasons: firstly, the fact that fossil fuels will run out in the future and there is therefore a search for alternatives and secondly, because biomass fuel is more environmentally friendly than fossil fuel, as will be explained hereinafter.

The great advantage of burning biomass in comparison with the burning of fossil fuel is that it is an essentially $CO_2$-neutral process. Whereas $CO_2$ is, indeed, released during burning of biomass, this, however, was extracted from the atmosphere recently (that is, in the past 1-25 years) by the plants from which the biomass formed. Thus, biomass burning fits excellently within the existing $CO_2$ cycle. This is a great difference with burning of fossil fuels in which $CO_2$ is released that had been stored in the Earth for so long that, practically seen, it not longer was part of the $CO_2$ cycle. Thus, burning of fossil fuel as it were "adds" $CO_2$ to the $CO_2$ cycle again. There is therefore a great demand for (improved) fuels in which biomass is used. However, as described before, there are disadvantages to the use of wood and other biomass as a starting material for producing a solid fuel.

The (Dutch) government has set a reduction target for $CO_2$ emission (in the Netherlands) (Kyoto agreement). There is extra attention for the role that biomass can play in it for energy production. Biomass is already used on a limited scale in the Netherlands as a fuel for the production of green electricity. A so-called coal covenant was entered into with the operators of coal-fired power plants in the Netherlands. This covenant dictates that coal must be replaced by a durable alternative fuel, such as, for example, biomass, for at least 10%.

The disadvantage, however, of the use of untreated biomass, such as, for example, wood, as a fuel is that it has a lower energy yield and cannot be used directly in the existing combustion plants.

Solid fuels based on biomass obtained by means, of torrefaction could in principle be used to this end; however, these products possess the disadvantages mentioned earlier.

It is an objective of the present invention to solve the above problems by means of an integrated process.

It is another objective of the present invention to provide a method for the preparation of a solid fuel as a coal substitute, wherein a continuous, guaranteed supply of starting material (raw materials) is available.

It is another objective of the present invention to provide a solid fuel that is technically suitable to be used universally for a multitude of combustion plants, preferably without any pre-treatment being required.

A further objective is to provide a method by which a solid fuel that meets the required specifications can be obtained whilst realising a good yield.

Yet another objective is to provide a solid fuel that has a high energy density and/or contains little fine dust, which is advantageous during storage and transport.

In addition, it is an objective of the present invention to provide a solid fuel that contributes to the reduction of $CO_2$ emission.

One or more of the above objectives are achieved by a method according to the introduction, which is characterised in that said heating takes place at a mass temperature of approximately 150 to approximately 360° C., wherein an SRF material is present in the starting composition.

The present invention provides a solution to the above problems by using SRF materials in the starting composition, instead of using pure biomass, such as, for example, wood.

The present inventors have found that by subjecting the SRF material to a torrefaction treatment, a solid fuel having surprisingly good properties can be obtained, which can then, in subsequent treatments, be brought to specification.

The use of SRF in torrefaction to obtain a solid fuel has never been described or proposed before.

FIG. 1 gives an overview of a temperature profile of a torrefaction treatment according to the present invention.

SRF is a term known in the field of secondary solid fuels and waste processing. It is an abbreviation of "Secondary Recovered Fuel", which stands for "secondary recovered fuel". It is a relative new raw material obtained from sorting and separation processes of waste streams intended to be used as secondary fuel in energy production processes. SRF is produced in so-called mechanical separation installations, wherein the starting point is corporate waste streams and/or household waste streams. Among others, the NTA 8003 (classification of biomass for energy use), 8023 (specification and classification biofuels) and CEN NPR-CEN/TS 15508 (key properties of solid secondary fuels), CEN NPR-CEN/TS 15359 (SRF specifications and classes) may apply with regard to the quality classification of these streams.

Household (residual) waste is a highly heterogeneous mixture of inter alia vegetable, fruit and garden waste, plastics, metals, such as ferro and non-ferro metals, and inert materials, such as sand, stone and glass. Household (residual) waste has a moisture content of more than 30 wt. %. Usually, household (residual) waste is burned in so-called WCPs (waste combustion plants) primarily to destroy the waste and as a side effect to produce energy. This manner of processing, however, gives a low energy yield per tonne of waste.

A different processing method of household (residual) waste, namely pyrolysis (heating to temperatures of approximately 500° C. to 800° C.) has both technically and economically turned out not feasible so far, as has become apparent from various installations that are known in the field. The disadvantages associated with the use of household (residual) waste are inter alia: the heterogeneous composition of the household (residual) waste, the high moisture content with the related high biological activity and odour nuisance.

WO 83/00046 describes that household waste as such, i.e. without any pre-treatment, can be subjected to a treatment method of indirect heating at a temperature of between 250 and 500° C., which corresponds to a torrefaction treatment. However, the product obtained by this treatment method cannot be indicated as being a solid fuel. Further, this method was found unsuitable for large-scale application. It has thus been shown to be impossible to convert untreated household waste to a solid fuel by means of torrefaction. This problem is solved by the present invention.

SRF is formed by the application of, for example, biological-mechanical separation methods (BMS) of mechanical-biological separation methods (MBS) from corporate waste streams and household (residual) waste streams. In these separation installations, the supplied waste streams are drastically freed from metals, inert materials, moisture and possible other undesired components. A product with a much more specified composition arises. As a result, maximum recovery of raw material and a production of a solid fuel is realized. Such processing of waste is increasingly used as an alternative for waste combustion plants.

During SRF production, the following process steps are carried out: the waste is brought to a defined particle size; the moisture content is decreased; ferro metals, non-ferro metals and inert materials are removed. Some (contaminating) substances are removed for more than 90%. The obtained SRF contains a combination of plastics, biomass, residual moisture and contaminations. The obtained SRF has defined properties in the area of: the dry-matter content, the percentage of contamination (inert materials and metals), the caloric value, the particle size, the element composition and the percentage of biomass present therein. These properties may vary, depending on the waste that is used as the starting material and the processing methods that are used. That is why the aforementioned CEN standards were developed.

As SRF has undergone different treatments and also possesses defined properties, SRF is not seen as a sub-stream of household or corporate waste, but as a fully separate product obtained from a waste stream (corporate waste and/or household (residual) waste), for which there are separate uses and markets. SRF thus is totally different from household and corporate waste with regard to their properties.

The advantages of SRF compared to household and/or corporate waste are the notable better (less in-homogene, dryer, higher caloric value) composition compared to the original waste streams. Moreover it is a biological stable product that has been extensively disposed of interfering compounds such as inert materials, glass, moisture, metals and raw ingredients.

Due to this, the present method can be used without hardly any external energy supply, possible to the point of autarkic energy, and where brittleness can occur, the quantities of by-products are limited whereby the method becomes simpler, more goal directed and more economical compared to the known methods from the literature.

With ever increasing consumption and the related increasing production of waste, the quantity of SRF material that can be produced from this, will only increase. Waste production is continuous and therefore, a continuous supply of starting material is available for the method according to the present invention.

An example of a commercially available SRF, which can be used in the method according to the present invention, is a mixture that is marketed under the registered trade name "Trockenstabilat". Trockenstabilat (brand) is a relative dry SRF material with a dry-matter content of approximately 85 wt. % and a water content of approximately 15 wt. %. Trockenstabilat (brand) contains, on the basis of dry matter, approximately 65 wt. % biomass, 9%. by weight plastics, 25 wt. % other fossil materials and approximately 1 wt. % inert materials. This SRF material is produced from a sub-stream of household waste: the household residual waste. In the method according to the present invention, it is also possible to apply an SRF material that is made from corporate waste. A combination of several SRF materials is also possible and should be aimed at within the framework of a product quality to be reached.

The direct use of such secondary fuels (SRF material) in combustion plants is possible; however, this often leads to relatively low conversion yields, such as, for example, in fluidised-bed combustion plants, of 20-25%. It has now been determined that these lower conversion yields to a large degree are the result of: the lower caloric value that these fuels have in comparison with for example coal; the scale dimensions of the used combustion plants as a result of which the technical optimisation is not fully economically profitable. Often, also the physical properties of any contamination of SRF material are a limiting factor for utilization in existing combustion plants. All these problems are solved by the present invention.

A further limiting factor in the direct utilization of SRF in combustion plants is the fact that SRF in general has a very low bulk weight of approximately 150-250 grams per liter. As a result, the quantity of energy per $m^3$ is limited and economically profitable transport can only take place by special means of transport and with special provisions, such as, for example, compaction in compaction containers or into bales.

The solid fuel according to the present invention possesses a higher bulk width than the starting material, namely >350 grams per liter, preferably >400 grams per liter which increases the possibilities concerning transport of the solid fuel. At a similar bulk width, it is economical profitable to transport the fuel uncondensed and as bulk material by ship, train or lorry, in contrast to a transport of raw SRF material.

Another limiting factor in the direct utilization of SRF in existing combustion plants is the fact that the particle size of the SRF cannot be processed in, for example, coal-fired power plants. In addition, SRF does not exhibit the required combustion behaviour. If SRF should be combusted in the existing coal-fired power plants, a radical technical adaptation of the existing infrastructure is necessary. Especially when these power plants were built according to the modern concept of pulverized-coal power plants. In these power plants, the combustion behaviour, among other things, which is related to particle size and ignition behaviour of great importance; SRF does not meet this requirement. Technically, economically and energetically, it is not justified to reduce SRF to a particle size of less than approximately 10 mm. The required particle size for a pulverized-coal power plant is less than 1 mm.

The present inventors have found that the present solid fuels, obtained by torrefaction of SRF, can be used excellently in powder coal-fired power plants. This way, conversion yields of 35-45% are reached instead of 20-25%. This thus gives maximum energetic valorisation of SRF.

Coal-fired power plants are inter alia used for the production of electricity for, inter alia, households and businesses. In coal-fired power plants, various kinds of coal with different compositions are mixed into a so-called "blend": "control fuel" which is subsequently combusted. The "blend" is selected to obtain an optimal price-yield ratio.

For the combustion of residual products of coal-fired power plants, notably for fly ashes, standards are being set regarding the quantity of heavy metals and trace elements allowed to be present therein. The reason for this is that these fly ashes are often used in concrete and as cement substitutes, for which legal requirements have been established for the quantity of heavy metals and trace elements.

The present inventors have surprisingly found that the use of SRF material in a torrefaction process to obtain a solid fuel may lead to excellent results regarding the levels of heavy metals and trace elements in the fly ash if a good raw materials mixture is selected.

The solid fuel obtained by using the present method can be used in coal-fired power plants without necessitating fundamental changes in the logistic infrastructure of the installations. The present solid fuel can even be used in pulverized-coal power plants as so-called ignition fuel because of the very good combustion behaviour (90% within 0.5 seconds) compared with coal with 40-80% in the same time.

The present solid fuel, obtained by using SRF, contains a certain biomass equivalent. The quantity of biomass originally present in the starting material is torrefied to torrefied biomass or biomass equivalent.

By combustion of a solid fuel comprising a certain quantity of biomass equivalent according to the present invention, a contribution is made to the aforementioned reduction target for CO, emission in the Netherlands. The percentage reduction of the $CO_2$ emission is calculated on the percentage of biomass present in the fuel and this percentage will thus vary with varying percentages of torrefied biomass in the present solid fuel. The present solid fuel may be used as one of the components of the aforementioned "blend" for coal-fired power plants.

Thus, the present invention provides a fuel that contributes to the reduction of $CO_2$ emission without using, for example, the costly starting material wood.

As the use of SRF as raw material falls under the legal regime for waste substances, the emissions of the production installations meet the applicable emission legislation, notably emission standards for waste combustion. This ranks the present technology among the cleanest production technologies and as such, establishes a new technological standard for the production of durable coal-substituting fuels. During the method, a number of undesired substances, present in the SRF, is removed by the selected procedures. This ensures that the present fuel is also an attractive fuel from an ecological viewpoint.

Torrefaction of SRF also leads to a reduction of the presence of certain heavy metals and trace elements such as, for example, mercury, cadmium, lead, chlorine, sulphur and nitrogen.

The described method is technically and economically already applicable at relatively low production capacities per year, for example from 30.000 t/a (tonnes per year).

It would therefore be useful to also establish, in the geographical vicinity of an installation where SRF is produced, an installation in which this SRF can be converted into a solid fuel by application of the present method. This way, logistic and ecological advantages are achieved. This solid fuel does not only have a higher bulk weight and energy density, but also a higher economic value.

Preferred embodiments of the present invention will be explained hereinafter.

In a preferred embodiment of the present invention, at least 50 wt. %, preferably at least 75 wt. % and in particular at least 90 wt. % SRF material, based on the dry weight of the starting composition, is present in the starting composition.

The phrase "based on the dry weight of the starting composition" is understood to mean the weight percentage that is present based on the weight of the dry components of the starting composition, thus with the exception of water. The dry weight is determined according to DIN NEN 12880 (February 2001).

The advantage of the use of at least 50 wt. % SRF is that good results are obtained with regard to the reduced quantity of fine dust in the obtained fuel. In addition, an excellent bulk weight is obtained and the purchase price of the solid fuel is reduced, as SRF is a cheap product, that is, even extra payment is currently made in the Netherlands for the purchase of SRF. The quantity of fine dust in the solid fuel can be further reduced by applying at least 75 wt. % SRF material in the starting composition and even more by applying at least 90 wt. % SRF material in the starting composition. It is of course also possible to apply up to even 100 wt. % SRF material as starting composition. See also the results from Table 1, hereafter.

If less than 100 wt. % SRF material is used, the remainder of the starting composition may for example consist of biomass, plastic fractions, paper fractions and cardboard fractions and the like, or combinations thereof.

By suitably selecting the starting composition, the properties of the obtained solid fuel such as particle size, chemical composition, quantity of fine dust and the like can be set and selected depending on the desired use of the eventual fuel.

In a preferred embodiment of the present invention, a method is provided in which 30 to 80 wt. %, preferably 55 to 60 wt. % biomass, based on the dry weight of the starting composition, is present in the starting composition. By 30 to 80 wt. % biomass the total quantity of biomass is meant that is present in the total of the starting composition, so in both the SRF material and in extra added materials, such as biomass. The SRF that is currently commercially available contains on average between 30 and 80 wt. % biomass, notably approximately 60 wt. %. If an SRF material is used in which the quantity of biomass is judged to be insufficient, it is possible to add supplemental (impure) biomass to the starting material.

Biomass as used in the present invention may for example consist of mixtures of (dried) waste remnants of vegetable, fruit, food remnants, grass waste, plant waste from the agrarian sector, woody components, paper, cardboard, digestate from fermentation installations and the like.

By mixing of SRF and biomass streams and possibly plastic fractions in a certain ratio, any desired starting composition and this way, any desired composition of the solid fuel can be obtained. Thus a fuel having a constant, reproducible and predetermined composition can be obtained, which offers major advantages.

In another preferred embodiment of the present invention, it is preferred that 10 to 70 wt. %, preferably 20 to 30 wt. % plastics, based on the dry weight of the composition, is present in the starting composition. By 10 to 70 wt. % plastics, the total quantity of plastics is meant, that is, the plastics that can already be considered to be a component of SRF and possibly extra added plastics.

As plastics, for example laminates, packaging films, synthetic fabrics, rubberlike materials and the like can be mentioned. The plastics may be both thermohardening and thermoplastic. However, in connection with the desired properties of the obtained solid fuel, wherein the softening of plastics plays a role as will be further explained hereafter, it is preferred that at least a part, more preferably at least 50 wt. %, in particular at least 75 wt. % and notably at least 90 wt. % or even 100 wt. % of the present plastics are thermoplastic plastics.

Such thermoplastic plastics are partially or entirely softened (plasticized) by the indirect heating used in the present method. The softening of SRF materials and other plastics leads to granulation of the final product. An advantage of granulate is that it is easy to transport, store and process further. A further advantage of the softening of the plastics, which advantage was surprisingly found by the present inventors and which had been completely unknown till now, is that any fine dust and fine biomass particle present in the starting material or formed during the method are embedded in the softened plastics, as a result of which an essentially dust-free product is obtained, which is not possible by application of known methods according to the prior art. The essentially dust-free product simplifies its storage, transport and processing.

It is preferred that 10 to 20 wt. % and preferably 12 to 17 wt. % water is present in the starting composition, based on the total weight of the starting composition, that is, the dry weight including water. Most SRF materials as commercially available contain moisture (at least 12% water). The final water content of the starting material is not solely determined by the water content of the SRF material, but also by the water contents of any extra added biomass and/or plastics. If necessary, an extra drying step may be carried out on the starting composition before the torrefaction treatment is carried out to obtain a starting composition with a desired water content. Such a drying step may for example be carried out by use of (residual) heat which is released during the torrefaction process.

It is preferred that the present method is carried out continuously, with starting material being supplied continuously to the torrefaction device. During this process, (residual) heat will be obtained, which may for example be used for a possible drying step of a raw material/starting composition which will be torrefied at a later point in time.

Preferably, maximally 5 wt. % and in particular maximally 2 wt. % contamination, such as, for example, metals, is present in the starting composition.

All components that are not biomass, plastics or water, are seen as contamination according to the present invention, even if these components still have commercial value after separation.

Commercially available SRF material contains certain concentrations of chemical elements. The concentration of such chemical elements in the flue gases of combustion plants is limited by legislation and regulations or for technical reasons. This concerns for example chemical elements like chlorine, cadmium, lead and mercury. Often, metal particles occur in SRF material, that is, particles of both ferro-metals and non-ferro metals, but notably the non-ferro metal aluminium.

During the production of SRF material, ferro metals are removed by use of, inter alia, magnets and non-ferro metals are removed for example by application of eddy current. However, aluminium is usually still found in SRF material as component of the layer structure of plastic laminates and other packaging remnants. Depending on the composition and intensity and thoroughness of the separation that takes place in the production of SRF from industrial or household (residual) waste, the weight percentage of such contamination will vary.

If a solid fuel contains chlorine compounds, both inorganic chlorine in the form of chlorine salts and as organic chlorine in the form of, for example, chlorine-containing plastics, during combustion of such a fuel chlorine gas or HCl will be formed which is not only poisonous and harmful for the environment but is also corrosive. Such chlorine compounds have a harmful effect on the combustion installations. By "total chlorine content" the sum of the level of inorganic chlorine and the level of organic chlorine is meant.

The present inventors have surprisingly found that it is possible to separate such contamination as metals and chlorine from the described solid fuel, as will be explained further hereafter. Such contaminations may be torrefied along, after which they will end up in changed or unchanged form in the present solid fuel.

The heating step according to the present method is preferably carried out in an indirectly heated rotating drum, also called revolving drum. Revolving drums are already used in waste combustion, pyrolysis, calcination and other heat treatments of bulk goods. The present inventors have shown that indirectly heated revolving drums are also especially suitable for carrying out the present method. Also indirect fluidised-bed techniques may for example be used or other techniques based on indirect heating. The present method can be carried out by using commercially available equipment.

The mass temperature during torrefaction is preferably gradually increased to a mass temperature of between 260 and 360° C., preferably 280-300° C. Mass temperature is understood to mean the temperature of the starting composition during the torrefaction process to the obtained final product, namely the solid fuel. During heating, at a temperature from approximately 90-100° C. the softening of thermoplastic plastics will start, which will lead to gas formation from approximately 150° C. As a result of the softening of thermoplastic plastics, part of the biomass will adhere, as it were, to the softened plastics. The formed torrefaction gases are collected and can be combusted, and the released flue gases are led through a heat exchanger to recover heat, which can be used again in the torrefaction process. Flue gas is a gas that is formed after the combustion of, for example, a fuel or a torrefaction gas or combustion gas. Torrefaction gas or combustion gas is the gas that forms during the process of torrefaction or (mild) pyrolysis and is burned to provide the energy required for the process. By accurate selection of the starting composition, the temperature path and the residence time, autarkic operation can be obtained, which means that after starting the process, no extra external energy is necessary because the process can provide its own energy requirement.

The present inventors have found that the quantity of released torrefaction gas can be determined by suitably selecting the mass temperature and the percentage of plastics in the starting composition. Such torrefaction gas can be combusted to obtain energy as a result of which autarkic operation is possible.

The mass temperature is subsequently increased, and at a temperature of approximately 160 to 180° C., degradation, inter alia of thermoplastic plastics, occurs. In addition, a temporary stabilisation in the temperature may occur, after which the temperature rises further to the final temperature, which is selected between for example 260 and 360° C., depending on inter alia the starting composition and the desired product.

During the torrefaction process of the biomass-containing starting material, part of the organic compounds are degraded under formation of so-called tars. This is known in the field of pyrolysis; however, in the torrefaction of biomass, this has hardly been discussed so far. Tar formation has three individual temperature paths with associated reaction mechanisms. In a temperature path of 200-350° C., so-called primary tar is formed, which are short-chained polyolefins or radicals thereof. In the sub-path of 280-350° C., enhanced formation of primary tar takes place because in addition to hemicellulose, cellulose degrades as well. The residence time plays a very important role in the formation of the quantity of tars and also determines the quantity of formed combustion gases. Formation of so-called "condensables" must be prevented as much as possible to avoid disturbances in the process. Condensables are compounds that condense at a slight temperature decrease. The second temperature path lies between 350-500° C. and along this path, conversion of radicals to cyclic aromatic compounds takes place. At temperatures above 500° C., polycondensation of the present aromatic compounds to polycyclic compounds occurs. Notably primary tar formation is of importance in this method.

The residence time of the material to be torrefied at the temperature used may vary, depending inter alia on the selection of starting material, the temperature and the desired physical and chemical properties of the final solid fuel. Preferably, the residence time is less than 100 minutes, in particular less than 45 minutes and notably, the residence time lies between 15 and 30 minutes. By residence time, the time is meant during which the starting composition is kept at a temperature of between 150 and 360° C. during the torrefaction process.

The present method also relates to a solid fuel to be obtained by a method as described above.

The present invention also relates to a method for the reduction of the "total chlorine content" of a solid fuel, such as described above, wherein the solid fuel is washed with a solvent, in which solvent chlorine compounds dissolve that are present in the solid fuel.

The term "washing" is understood to mean the contacting of the torrefied solid fuel with the solvent for a certain period of time, during which chlorine compounds can dissolve in the solvent, and the subsequent separation of the washed torrefied solid fuel and the solvent in which the chlorine compounds are dissolved.

By the application of the present method it is possible to reduce the "total chlorine content" of the torrefied solid fuel, as a result of which problems regarding corrosivity can be prevented and the legal requirements can be met as well.

Various plastics may be present in SRF, such as, for example, polyethylene (PE), polypropylene (PP), polyethylene terephtalate (PET), polystyrene (PS), polyvinyl chloride (PVC) and polyvinylidene chloride (PVDC). Notably PVC and PVDC require attention, owing to the fact that these are chlorine-containing plastics. It is therefore preferred to remove the chlorine that is present in PVC and PVDC, if possible, from the solid fuel before the solid fuel is used in a combustion plant. This is achieved by an embodiment of the present invention.

It is usual that the "total chlorine content" of solid fuels is investigated by means of a caloric destruction method by application of DIN 51727 (June 2001). The aim is to keep this "total chlorine content" as low as possible.

The present inventors have found, during extensive research, that the "total chlorine content" can be reduced to some degree by means of torrefaction of a starting material in which SRF material is present.

However, extensive research carried out by the present inventors into the underlying mechanism hereof, revealed a number of surprising things. It turns out that the "total chlorine content" of a non-torrefied SRF material based on household (residual) waste does not only consist of organic chlorine originating from PVC, but that also inorganic chlorine salts are present in this SRF material. Examples of inorganic salts of chlorine are, for example, chlorine salts of alkali metals and earth alkali metals.

This inorganic chlorine ensures, as it were, a background value of chlorine present in SRF material. The present inventors determined that this background value is approximately 0.45 wt. %. During torrefaction, these inorganic salts will remain present without reacting.

Because of the hydrophilicity and the biological activity of SRF material, it turned out not to be possible to wash the SRF material prior to torrefaction to remove the inorganic chlorine.

During torrefaction of the SRF-material containing starting material a weight reduction will occur because of, inter alia, evaporation of water and also because of the escape of torrefaction gases which are formed by degradation of, for example, plastics. Because of this weight reduction, the concentration of inorganic chlorine in the torrefied solid fuel will be higher than in the starting composition.

Further, it turned out, surprisingly, that essentially all chlorine compounds that are present in the torrefied solid fuel are in the form of inorganic chlorine. The organic chlorine, such as, for example, present in the form of PVC, is converted during torrefaction. During the thermal destruction of PVC, HCl is formed. In the literature (Detailed kinetic modeling of the thermal degradation of vinyl polymers; Tiziano Faravelli; Journal of Analytical and Applied Pyrolysis, part 78, no. 2, pages 343-362, 2007), it is reported that during heating in a temperature path of 300-500° C., inter alia, PVC exhibits gradual release of the organic chlorine present in it. The present inventors have now surprisingly found that in the case of SRF, this already takes place earlier at a temperature as low as 250° C. Without being restricted by a theory, it is assumed that the presence of organic radical products (primary tar) plays a role, as well as interaction based on the mineral compounds that are present, notably earth alkali metals, alkali metals, which can act as chlorine acceptors. Such mineral compounds are present in, for example, chalk, dolomite and kaolinite which may be present as fillers in the plastic or as coating on the paper particles present. This corresponds with what the present inventors have surprisingly found, namely that only a part of this HCl gas is removed with the torrefaction gases. The remaining HCl gas will react with other aforementioned compounds that are present in the SRF-material containing starting material. Predominantly organic chlorine compounds are formed from the reaction of HCl with compounds from the SRF material.

This therefore means that the present inventors have shown that the organic chlorine that is present in the starting material containing SRF material will, by means of the torrefaction, be converted into a part free HCl and the remainder into inorganic chlorine compounds of alkali and earth alkali metals, notably KCl, $MgCl_2$ and $AlCl_2$. This discovery led to the present method.

"Inorganic chlorine" is soluble in various solvents, such as, for example, water, and can therefore be removed from the torrefied solid fuel by means of washing with a solvent.

Therefore, the present inventors have established that is it possible to lower the "total chlorine content" by means of washing of the torrefied solid fuel with a solvent in which the chlorine compounds, notably inorganic chlorine and any traces of organic chlorine compounds, dissolve. Furthermore, the level of trace elements can also be reduced by this method.

Without wishing to be bound by theory, the present inventors assume that the formed inorganic chlorine is notably present in the form of calcium chloride, sodium chloride, potassium chloride and other chlorides, which salts can be excellently washed off by using a solvent, such as, for example, an aqueous solvent.

The aforementioned reduction in the chlorine content, which can be obtained solely by the torrefaction, so without washing, is a balance between the escaping HCl as a result of which the total chlorine content decreases and the concentration of the inorganic chlorine, because of the weight reduction as a result of the torrefaction, as a result of which the chlorine content (mg/kg solid matter) increases. This is the reason that only a very limited or even no chlorine reduction (mg/kg solid matter) is found during the torrefaction as such. The consequence of this is, however, that the present invention may be applied to remove the formed inorganic salts in a simple manner.

The combination of torrefaction and washing according to the present invention is therefore capable of providing a torrefied solid fuel with reduced chlorine content, wherein the "total chlorine content" can be determined accurately in advance so that it fits in a simple manner within the desired specifications that apply according to legislation and regulations and customer specifications in connection with technical requirements.

It should be noted that the solvent loaded with chlorine compounds must be removed in a suitable manner, taking in view the environmental regulations. This could for example be solved by evaporation of the solvent to obtain solid chlorine compounds (salts). A possible method for this is injection of the loaded solution in the treatment installation for the flue gases, which flue gases are obtained during combustion of the torrefaction gases. The solid chlorine compounds are collected by the filters that are present in the flue gas treatment installation. The HCl that disappears with the torrefaction gases will also be removed by such a treatment installation. The advantage of this embodiment is that thus all removed chlorine can be collected while using an existing treatment installation.

An extra advantage of the present method of torrefaction and the subsequent washing of the solid fuel is that in addition to chlorine compounds also sulphur and sulphur compounds can be removed for as much as 30-50%, as well as already present soluble salts and alkali metals.

The present inventors have found that by the formation of alkali chlorides during torrefaction and the subsequent washing thereof, a clear reduction of the present alkali metal concentration occurs in the formed fuel.

The removal of the alkali metals and earth alkali metals has the consequence that an increase of the fly ash softening point occurs in the fly ashes that are released during the eventual combustion of the produced fuel. Alkali metal compounds after all easily form eutectic melting points, notably a combination of sodium and potassium. This rise of softening points as a result of removal of alkali metal, was confirmed by measurements. Also the change in the ratio between sodium and potassium already has an influence on the softening point of the fly ash. All these things together help to improve the quality of the solid fuel significantly.

It is preferred to provide a solid fuel with a reduced chlorine content that can be used as such or that can be used as a component of the "blend" in powder-coal power plants without the "total chlorine content" in the total "blend" exceeding the limiting values that have been set. The fuel according to the present invention, subjected to the method for the reduction of the chlorine content, meets this requirement.

In a preferred embodiment according to the present invention, an aqueous solvent is used as a solvent for washing off the chlorine compounds; notably water is used as a solvent. Water as such or an aqueous solution are preferred because they are very suitable for removing the inorganic salts from the solid fuel because of the solubility of these salts in water. It is possible to apply as solvent an aqueous solution of one or more compounds that increase the water-solubility for the chlorine compounds and possibly the trace elements. Examples of compounds that increase the water-solubility are organic acids and complex formers.

Washing of the fuel formed by torrefaction also offers the possibility to realize reduction of the concentration of undesired trace elements by the addition of complex formers to the solvent.

In one embodiment, washing of the torrefied solid fuel is carried out immediately after torrefaction of the starting composition, while the mass temperature of the torrefied solid fuel is 150-360° C. This is thus the quenching of the hot torrefied solid mass immediately after torrefaction. This may, for example, be carried out by tipping the hot torrefied solid fuel in a bath containing a solvent, preferably water.

This embodiment has a number of advantages. The first advantage is that the process time is shortened as it is not necessary to allow the torrefied solid fuel to cool before it can be washed. The second advantage is that a bath containing a solvent also serves as a so-called wet lute which seals the content of the reactor against any incoming oxygen. A third advantage is that the solubility of inorganic chlorine compounds at temperatures of 60-80° C. is highly increased. A fourth advantage is that a number of product properties, such as, for example, brittleness and pore volume, are influenced positively.

It is of course also possible to wash an already cooled solid fuel with solvent at a later stage. This may notably be preferred when a fuel with a more defined particle size must be produced. In that case, a crushing installation is placed between the torrefaction and the washing.

In another embodiment of the present invention, prior to washing the solvent is heated to a temperature of 30-100° C., preferably 60-80° C. As a result, the solubility of the chlorine compound in the solvent is increased.

It is also possible to carry out more than one washing step. An example is the first moistening with solvent or quenching of the torrefied solid fuel, after which the moistened torrefied solid fuel is contacted with additional solvent by means of, for example, a counter-flow of additional solvent. The well known counter-flow principle makes it possible to obtain an increased degree of separation by using a certain quantity of solvent.

According to a preferred embodiment, the present method comprises an additional step after the washing of the torrefied solid fuel with the solvent, which additional step comprises the drying of the washed torrefied solid fuel.

It is possible that the available residual heat of the torrefaction process is used for the drying of the washed torrefied solid fuel.

Preferably, the solid fuel is dried to a moisture content of less than 10 wt. %, notably less than 5 wt. %

The drying step reduces the weight of the torrefied solid fuel as a result of which thus storage and transport are simplified. In addition, the reduction of the moisture content makes the solid fuel suitable again for use in combustion plants. The moisture content can be selected appropriately depending on the desired application and required lower caloric value (LCV).

In a further embodiment of the present invention, the method comprises an additional step of reducing the torrefied solid fuel to a particle size between 0.5 mm and 5 mm, which step is carried out prior to the washing of the torrefied solid fuel with the solvent.

As already indicated above, it is preferred that the torrefied solid fuel be used as a solid fuel in the form of a granulate. If the granulate size of the solid fuel is greater than 5 mm, the surface-to-volume ratio will be such that it is less simple to wash off the present chlorine compounds. Therefore, a greater quantity of solvent or a longer washing time will be necessary. If, however, a solid fuel is used with a granulate size that is less than 0.5 mm, the washing step can be carried out simply and quickly by using little solvent; however, the separation of the solvent and the solid fuel will need to be carried out in a less simple manner and therefore, it is preferred to carry out the reduction of the torrefied solid fuel to a particle size between 0.5 mm and 5 mm, notably between 1 mm and 4 mm.

As, during the methods according to the present invention, a granulate is formed, it becomes possible to obtain a solid fuel with the desired composition and properties by an appropriate selection of the method parameters such as heating rate, temperature distribution, rotation speed if a rotating drum is used, placement of inserts, such as 'guiding vanes' placed in the drum. The presence of fine dust functions as a kind of breadcrumbs layer and thereby prevents the formation of larger granulates by mutual adherence of different small granules.

The present invention also relates to a solid fuel with decreased chlorine content to be obtained according to the aforementioned method.

The present invention also relates to a method for the removal of one or more metals from a solid fuel, which method comprises the steps of:
  providing a solid fuel,
  reducing the solid fuel thus obtained to a particle size of less than 3 mm, preferably less than 2 mm, in particular less than 1 mm,
  separating one or more metals from the reduced solid fuel thus obtained.

The present method for the removal of one or more metals from a solid fuel may inter alia be used for further purification of the solid fuel obtained by using any one or more of the aforementioned methods or which is applied to one of the aforementioned solid fuels. It is thus possible to apply this method immediately after obtaining, by torrefaction, of the solid fuel or after the method for reducing the chlorine content.

It is preferred that the size reduction of the obtained solid fuel is carried out by crushing the solid fuel. The size reduction of the solid fuel by crushing is preferred to, for example, milling of the solid fuel. By crushing, only the size of the brittle granulate is reduced, whereas the size of metal particles, such as, for example, aluminium particles, is not influenced. Such metal particles thus retain their original dimensions (length×width), which simplifies the separation of granulate and metal particles.

The crushing may for example be carried out by using a roller construction, such as a roll crusher with adjustable opening, or a jaw crusher or reduction machinery with similar action. The thus obtained particles may possess an angular or shard-like shape.

The separation is preferably carried out screening. Screening is a simple technique by which the size-reduced particles having a pre-set particle size can be separated from the plastic particles, for example metal particles, present in the solid fuel, which have a greater diameter. Other separation techniques such as cyclonage, upstream techniques or eddy current may also be applied to separate the metals. With the present invention it is possible to separate essentially quantitatively metals from the solid fuel.

It is preferred to separate aluminium. Aluminium is a metal that can be recycled well and aluminium scrap possesses a high energy content and also a high economic value. Therefore, it is an advantage of the present invention that aluminium (aluminium scrap) can be recovered to a large degree from the solid, torrefied fuel so that it can be sold as separate additional stream.

A further advantage of the separation of metallic aluminium is that metallic aluminium may lead to problems in combustion plants if present in the solid fuel. If aluminium metal is combusted, so-called pyrophoric aluminium may form at certain locations in the fire, which is highly flammable and which, in combustion plants, may lead to fires that can hardly be extinguished, if at all. Thus, the present method ensures the separation of aluminium for a much safer fuel, whilst the precious aluminium is moreover reused rather than combusted.

In addition to that it is an advantage that the fly ash that is obtained in pulverized-coal power plants by the combustion of the solid fuel from which aluminium has been removed possesses a lower aluminium oxide content, which may be advantageous. The quantity of fly ash in total is reduced by the removal of metal or metal salts from the solid fuel.

Aluminium in waste is often present in the form of laminates, that is, in very thin layers embedded between, for example, layers of plastic. This aluminium present in laminate cannot be separated in a simple manner because of the strong adhesion to the adjoining plastic layers. By the present torrefaction process, aluminium is separated from the plastics when the plastic layers soften and/or char. Aluminium will be present in the solid fuel as "unbound" particles.

The present invention also relates to a purified solid fuel from which metals have been removed that is obtained by means of the above method.

It is preferred that the solid fuel is in the form of granulate. The granulate size is preferably less than 40 mm and in particular less than 10 mm.

In the case of a solid fuel from which metal has been removed according to the present method, the particle size is preferably less than 3 mm, in particular less than 2 mm, notably less than 1 mm. This simplifies the removal of the metals, which keep their original size.

Solid fuels having a particle size of ≦1 mm can be used directly in the combustion furnace of pulverized-coal power plants. Solid fuels having a particle size between 1 and 3 mm can be fed into a milling device of a coal-fired power plant, where they are reduced to a particle size of ≦1 mm.

The size of the granulate will co-determine the application and any further processing hereof. The present inventors do not wish to be limited by a particular theory, but assume that the granulate size is determined to a large degree by the size of the starting material and any size reduction steps during subsequent methods. During the torrefaction process, plastic shreds or plastic particles in the SRF material will soften and biomass will be imbedded in these softened plastic particles to form a granulate of the solid fuel. Thus, an SRF material with a greater particle size will lead to a solid fuel with greater granulate size. This has been confirmed in tests. The granulation is further influenced by the temperature settings during the process and the manner of operation.

The formed granulates can be brittle and the brittleness, inter alia, is determined by recipe, the selection of raw materials, the temperature settings and the residence time and are therefore controllable. The brittleness may for example be of importance in the processing of the solid fuel, for example when it needs to be reduced. After all, said brittleness/porosity makes it easy to reduce the material.

The granulates formed may also possess a certain, and in some cases even a high degree of porosity. This porosity can be influenced by the selection of raw materials and process conditions.

SRF may exhibit a certain degree of dustiness, that is, contain a certain fraction of small particles. This dust fraction can be reduced or even totally eliminated by the torrefaction process according to the present invention in which the dust particles are embedded in the softened plastics.

In a preferred embodiment of the solid fuel according to the present invention 40 to 90 wt. %, preferably 60 to 65 wt. % torrefied biomass, based on the dry weight of the fuel, is present in the starting composition. By torrefied biomass, biomass is meant that has been subjected to a torrefaction treatment. In comparison with the starting material, a somewhat higher percentage of biomass may be present in the solid fuel as a part of the other components, such as, for example, plastics, that have been combusted during the process will convert into gas form. It is in particular preferred that between 10 and 60 wt. %, preferably 15 to 25 wt. %, based on the dry weight of the solid fuel, torrefied plastics are present in the solid fuel. The quantity of torrefied plastics in the torrefied solid fuel is lower than the plastics content in the starting composition as a part of the plastics degrades during the torrefaction process and converted into gas.

In a preferred embodiment of the present invention, both torrefied biomass and torrefied plastics are present in the solid fuel, whilst at least a part, preferably at least 40% and in particular at least 60% of the torrefied biomass, is embedded in the torrefied plastics.

As already mentioned above, softening of the thermoplastic plastics occurs during the torrefaction process. In such softened condition, dust particles and the now torrefied or not yet fully torrefied biomass particles will be partially absorbed and embedded in the torrefied plastics to obtain composite granulate.

It will, however, be clear that another part of the torrefied biomass, notably the particles with a somewhat greater dimension, will not be embedded in the torrefied plastics and will be present separately in the solid fuel.

A further advantage of the fact that parts of the torrefied biomass are embedded in the torrefied plastics is that the solid fuel according to the present invention contains little to no dust because a part of or all this dust has been embedded in the torrefied plastics and is retained in it.

In a preferred solid fuel according to the present invention, maximally 5 wt. % and in particular maximally 2 wt. % metals are present based on the dry weight of the solid fuel before the method for removal of metals is carried out. After carrying out of this method, the metal content is preferably maximally 0.5 wt. % and in particular maximally 0.1 wt. % and has therefore been significantly reduced. These metals may for example consist of ferro and non-ferro metals.

Preferably, less than 10 wt. %, and in particular less than 5 wt. % water, based on the total weight of the solid fuel, is present in the obtained solid fuel. The water content in the starting composition is decreased by the torrefaction process, in which said water is converted into steam. Subsequently, the water content is increased by the washing and eventually be brought to the desired specification by drying.

The lower caloric value is preferably greater than 18 MJ/kg, notably greater than 20 MJ/kg, which is determined by DIN 51900-1 (April 2000+February 2004).

The present invention offers the possibility to influence, in a process-oriented manner, the quality and properties of a substitute for solid fossil fuels. This was achieved by the present inventor through a unique combination of process steps combined with the utilization of chemical and physical properties present in SRF and impure biomass.

The present invention actually consists of a number of related process steps for the preparation of a solid fuel from SRF-containing material with predetermined properties by means of the following steps:
  mixing of the starting material;
  torrefaction of the starting material;
  removal of one or more metals from the obtained fuel;
  reduction of the chlorine and/or sulphur content;
  reduction/control of the trace elements present in the solid fuel;
  rise of the melting points of the fly ashes originating from these starting materials, released in the combustion of these fuels.

In the method according to the present invention a number of these steps can be combined.

Hereafter, an overview is given of the different embodiments of the present method and the present solid fuel.

In a first embodiment of the method according to the present invention, a method is provided for the preparation of a solid fuel by torrefaction, wherein a starting composition is indirectly heated, wherein heating takes place at a mass temperature of approximately 150 to approximately 360° C., wherein an SRF material is present in the starting composition.

In a preferred embodiment of this first embodiment of the method according to the present invention, at least 50 wt. %, preferably at least 75 wt. %, and in particular at least 90 wt. % SRF material, based on the dry weight of the starting composition, is present in the starting composition.

In a preferred embodiment of this first embodiment of the method according to the present invention, in total 30 to 80 wt. % biomass, based on the dry weight of the starting composition, is present in the starting composition.

In a preferred embodiment of this first embodiment of the method according to the present invention, in total 20 to 70 wt. % plastics, based on the dry weight of the starting composition, is present in the starting composition.

In a preferred embodiment of this first embodiment of the method according to the present invention, in total 10 tot 20 wt. %, preferably 12 to 17 wt. % water, based on the total weight of the starting composition, is present in the starting composition.

In a preferred embodiment of this first embodiment of the method according to the present invention, maximally 5 wt. %, preferably maximally 2 wt. % contamination, based on the dry weight of the starting composition, is present in the starting composition.

In a preferred embodiment of this first embodiment of the method according to the present invention, heating is carried out in a rotating drum.

In a preferred embodiment of this first embodiment of the method according to the present invention, heating takes place gradually until a mass temperature is reached of between 260 and 360° C.

In a preferred embodiment of this first embodiment of the method according to the present invention, the residence time of the starting composition at a temperature between 150 and 360° C. is less than 100 minutes, notably less than 45 minutes and in particular between 10 and 30 minutes.

In a first embodiment of the fuel according to the present invention, a solid fuel is provided, to be obtained according to a method according to the first embodiment of the present invention.

In a preferred embodiment of this first embodiment of the fuel according to the present invention, the fuel is in the form of a granulate.

In a preferred embodiment of this first embodiment of the fuel according to the present invention, the granulate size less than 40 mm.

In a preferred embodiment of this first embodiment of the fuel according to the present invention, the granulate size is less than 10 mm.

In a preferred embodiment of this first embodiment of the fuel according to the present invention, 40 to 90 wt. % torrefied biomass, based on the dry weight of the solid fuel, is present in the solid fuel.

In a preferred embodiment of this first embodiment of the fuel according to the present invention, 10 to 60 wt. % torrefied plastics, based on the dry weight of the solid fuel, is present in the solid fuel.

In a preferred embodiment of this first embodiment of the fuel according to the present invention, plastics are present in the solid fuel torrefied biomass and torrefied, whilst at least a part, preferably at least 40 wt. %, and in particular at least 60 wt. % of the torrefied biomass, is embedded in the torrefied plastics.

In a preferred embodiment of this first embodiment of the fuel according to the present invention, maximally 5 wt. %, in particular maximally 3 wt. % contamination, based on the dry weight of the solid fuel, is present in the solid fuel.

In a preferred embodiment of this first embodiment of the fuel according to the present invention, less than 5 wt. %, preferably less than 3 wt. % water, based on the total weight of the solid fuel, is present in the solid fuel.

In a second embodiment of the method according to the present invention, which in fact is a possible subsequent method following the method according to the first embodiment, a method is provided for the removal of one or more metals from a solid fuel, which method comprises the steps of: the provision of a solid fuel according to the first embodiment of the fuel or obtained according to the first embodiment of the method according to the present invention; the reduction of the thus obtained solid fuel to a particle size of less than 3 mm, preferably less than 2 mm, in particular less than 1 mm; the separation of one or more metals from the thus obtained solid fuel of which the size has been reduced.

In a preferred embodiment of this second embodiment of the method according to the present invention, the reduction is carried out by means of the crushing of the solid fuel.

In a preferred embodiment of this second embodiment of the method according to the present invention, the separation is carried out by means of screening.

In a preferred embodiment of this second embodiment of the method according to the present invention, aluminium is separated as said one or more metals.

In a preferred embodiment of this second embodiment of the method according to the present invention, the crushing is carried out by using a roller construction, a jaw crusher or a combination thereof.

In a second embodiment of the fuel according to the present invention, a purified solid fuel is provided by carrying out the method according to the second embodiment of the present invention.

In a preferred embodiment of this second embodiment of the fuel according to the present invention, the particle size of the purified solid fuel is less than 3 mm, preferably less than 2 mm, in particular less than 1 mm.

In a preferred embodiment of this second embodiment of the fuel according to the present invention, 40 to 90 wt. % torrefied biomass, based on the dry weight of the purified solid fuel, is present in the fuel.

In a preferred embodiment of this second embodiment of the fuel according to the present invention, 10 to 60 wt. % plastics, based on the dry weight of the purified solid fuel, is present in the fuel.

In a preferred embodiment of this second embodiment of the fuel according to the present invention, torrefied biomass and torrefied plastics are present in the purified solid fuel, whilst at least a part, preferably at least 40 wt. %, and in particular at least 60 wt. % of the torrefied biomass, is embedded in the torrefied plastics.

In a preferred embodiment of this second embodiment of the fuel according to the present invention, maximally 0.5 wt. %, and preferably maximally 0.1 wt. % metals, based on the dry weight of the purified solid fuel, is present in the fuel.

Further, the present invention relates to the use of a solid fuel according to the first or second embodiment of the present invention or of a solid fuel obtained according to a method according to the first and second embodiments of the present invention or a combination thereof as a fuel for a coal-fired power plant.

In a third embodiment of the method according to the present invention, which is actually a possible subsequent method following the method according to the first embodiment, a method is provided for the reduction of the "total chlorine content" of a torrefied solid fuel obtained according to the present invention, wherein the torrefied solid fuel is washed with a solvent, in which solvent chlorine compounds present in the torrefied solid fuel dissolve.

In a preferred embodiment of this third embodiment of the method according to the present invention, the solvent is an aqueous solvent.

In a preferred embodiment of this third embodiment of the method according to the present invention, the solvent is water.

In a preferred embodiment of this third embodiment of the method according to the present invention, the solvent is an aqueous solution of one or more compounds that increase the water-solubility of the chlorine compounds.

In a preferred embodiment of this third embodiment of the method according to the present invention, the "total chlorine content" of the washed torrefied solid fuel is maximally 0.5 wt. %, preferably maximally 0.3 wt. %, in particular maximally 0.2 wt. % and notably maximally 0.1 wt. %

In a preferred embodiment of this third embodiment of the method according to the present invention, the torrefaction of the starting composition is carried out by indirectly heating the starting composition at a mass temperature of approximately 150 to approximately 360° C.

In a preferred embodiment of this third embodiment of the method according to the present invention, the torrefied solid fuel is washed immediately after the torrefaction of the starting composition, while the mass temperature of the torrefied solid fuel is 150-360° C.

In a preferred embodiment of this third embodiment of the method according to the present invention, the solvent is heated to a temperature of 30-100° C., preferably 60-80° C. before it is used to wash the torrefied solid fuel.

In a preferred embodiment of this third embodiment of the method according to the present invention, the method comprises an additional step of washing, which additional step is carried out on the washed torrefied solid fuel.

In a preferred embodiment of this third embodiment of the method according to the present invention, the torrefied solid fuel is quenched with the solvent immediately after the torrefaction of the starting composition, after which the torrefied solid fuel moistened with solvent is washed in counter-stream with additional solvent.

In a preferred embodiment of this third embodiment of the method according to the present invention, the method comprises an additional step after washing of the torrefied solid fuel with the solvent, the additional step comprising the drying of the solid fuel moistened with solvent.

In a preferred embodiment of this third embodiment of the method according to the present invention, the method comprises an additional step of the reduction of the torrefied solid fuel to a particle size of between 0.5 mm and 5 mm, the step being carried out prior to the washing of the torrefied solid fuel with the solvent.

In a third embodiment of the fuel according to the present invention, a solid fuel with reduced chlorine content to be obtained by using a method according to the third embodiment of the present invention is provided.

In a preferred embodiment of this third embodiment of the fuel according to the present invention, the "total chlorine content" is maximally 0.5 wt. %, preferably maximally 0.3 wt. %, in particular maximally 0.2 wt. % and notably maximally 0.1 wt. %

In a preferred embodiment of this third embodiment of the fuel according to the present invention, the solid fuel is in the form of a granulate.

In a preferred embodiment of this third embodiment of the fuel according to the present invention, the granulate size is less than 40 mm.

In a preferred embodiment of this third embodiment of the fuel according to the present invention, the granulate size is less than 10 mm.

In a preferred embodiment of this third embodiment of the fuel according to the present invention, 40 to 90 wt. % torrefied biomass, based on the dry weight of the solid fuel, is present in the solid fuel.

In a preferred embodiment of this third embodiment of the fuel according to the present invention, 10 to 60 wt. % torrefied plastics, based on the dry weight of the solid fuel, is present in the solid fuel.

In a preferred embodiment of this third embodiment of the fuel according to the present invention, torrefied biomass and torrefied plastics are present in the solid fuel, wherein at least a part, preferably at least 40 wt. %, and in particular at least 60 wt. % of the torrefied biomass is embedded in the torrefied plastics.

In a preferred embodiment of this third embodiment of the fuel according to the present invention, maximally 5 wt. %, in particular maximally 3 wt. % contamination, based on the dry weight of the solid fuel, is present in the solid fuel.

In a preferred embodiment of this third embodiment of the fuel according to the present invention, less than 5 wt. %, preferably less than 3 wt. % water, based on the total weight of the solid fuel, is present in the solid fuel.

Further, the present invention relates to the use of a solid fuel according to the third embodiment of the present invention or of a solid fuel obtained by using a method according to the third embodiment of the present invention as a fuel for a coal-fired power plant of for another form of energy production.

The present invention thus relates firstly to a method for obtaining a solid fuel and secondly to a number of subsequent methods for purifying said solid fuel.

In summary, it can be stated that SRF, before it is subjected to the present method(s), has an undefined particle size, is not millable, has a varying chemical composition, is not fully homogenous, is fluffy and dusty, is biologically active, is water-absorbent, has a high chlorine content and is volume-determining. During the process to obtain a solid fuel according to the present invention, one or more of the following processing steps are inter alia carried out, namely torrefaction, chlorination, desulfatation, increase of the caloric value, reduction of the mercury content, reduction of the alkali metal content, and the recovery of non-ferro metals, notably aluminium. This has as consequence that a solid fuel according to the present invention is obtained with a defined particle size, a defined millability, a defined chlorine content, a defined sulphur content, a minimised mercury content, a fully homogenised product, a product that is suitable for combustion along with existing fuels in, for example, pulverized-coal power plants, a product that is biologically inactive and hydrophobic, a product that is weight-determining, a product with a reduced level of alkali metals and a defined combustion behaviour.

The present invention will now be further explained by means of the following, non-limiting, examples.

EXAMPLES

Examples 1-8 and Comparative Examples 1 and 9

A starting composition was prepared by mixing of a certain quantity of SRF consisting of 60 wt. % biomass and 38 wt. % plastics and 2 wt. % contamination based on dry matter, and a certain quantity of biomass, of the type B-wood. The starting material was treated in a rotating drum at a temperature profile, whilst the starting material was heated to 330° C. for in total 45 minutes.

Comparative example 9 is non-torrefied biomass that cannot be crushed.

The obtained products are assessed for a number of properties: granulation, quantity of fine dust, combustion behaviour, $CO_2$ reduction, suitability as bulk goods, dust formation during crushing and percentage of volatile compounds in the solid fuel. These properties are assessed by means of the following criteria: − − very bad, − bad, o moderate, + good, + + very good.

Granulation is assessed more positively if a greater portion of the solid fuel is in the form of a granulate.

LCV (lower caloric value) is assessed more positively if this is greater. As the limit for large-scale energy production, 20 MJ/kg is used, in connection with the temperature of the fire that can be reached and the related conversion yield.

Quantity of fine dust is assessed more positively if a smaller quantity of fine dust is present in the solid fuel.

Combustion behaviour is assessed more positively if the size of the formed granulate particles is smaller.

$CO_2$ reduction is assessed more positively is more biomass is present in the solid fuel.

Suitability as bulk goods is assessed more positively if a better compromise is obtained between a high bulk weight, a small quantity of fine dust and a high porosity. Such a compromise makes it possible that the solid fuel can be transported well as bulk goods by, for example, a ship, train or truck without needing to be compacted.

Dust formation during crushing is assessed more positively if less dust formation occurs during crushing. This property is notably of importance because of the safety during the crushing process, safety declining at a greater quantity of dust formation.

Percentage of volatile compounds in the solid fuel will be assessed more positively with increasing weight percentage of volatile compounds present in the solid fuel. Such volatile compounds are highly flammable and improve the combustion behaviour of the solid fuel. If the percentage becomes too high, the advantage turns into a serious disadvantage in connection with the high flammability.

Table 1 shows examples 1-8 and comparative example 1*.

As will be clear from Table 1, the solid fuels according to the present invention show better results with regard to granulation and quantity of fine dust than the solid fuel according to comparative example 1. Further it will clear from Table 1 that solid fuels with an increasing proportion of SRF in the starting composition give better results regarding granulation, quantity of fine dust, combustion behaviour, suitability as bulk goods and dust formation during crushing, without the properties regarding $CO_2$ reduction and percentage volatile compound deteriorating excessively.

TABLE 1

| Ex | SRF wt. % based on dry matter | extra biomass wt. % based on dry dust | wt. % biomass in starting composition | wt. % plastics in starting composition | granulation | quantity of fine dust | combustion behaviour | $CO_2$ reduction | suitability as bulk goods | dust formation during crushing | percentage of volatile compounds in solid fuel | LCV |
|---|---|---|---|---|---|---|---|---|---|---|---|---|
| 1* | 0 | 100 | 100 | 0 | − − | − − | + | ++ | − | − − | ++ | 0 |
| 1 | 25 | 75 | 90 | 95 | − | − | + | + | − | − − | ++ | 0 |
| 2 | 40 | 60 | 84 | 15.2 | o | o | + | + | − | − | ++ | + |
| 3 | 50 | 50 | 80 | 19 | + | o | + | + | o | − | + | + |
| 4 | 60 | 40 | 76 | 22.8 | + | + | + | + | o | o | + | + |
| 5 | 70 | 30 | 72 | 26.6 | + | + | + | + | + | o | + | + |
| 6 | 80 | 20 | 68 | 30.4 | ++ | ++ | + | + | + | + | + | ++ |
| 7 | 90 | 10 | 64 | 34.2 | ++ | ++ | ++ | + | ++ | + | + | ++ |

TABLE 1-continued

| Ex | SRF wt. % based on dry matter | extra biomass wt. % based on dry dust | wt. % biomass in starting composition | wt. % plastics in starting composition | granulation | quantity of fine dust | combustion behaviour | $CO_2$ reduction | suitability as bulk goods | dust formation during crushing | percentage of volatile compounds in solid fuel | LCV |
|---|---|---|---|---|---|---|---|---|---|---|---|---|
| 8 | 100 | 0 | 60 | 38 | ++ | ++ | ++ | + | ++ | ++ | + | ++ |
| 9* | 100 | 0 | 60 | 38 | -- | -- | 0 | + | -- | n.a. | o | o |

Table 2 shows the weight loss for a starting composition according to Example 8 during the torrefaction process, depending on the mass temperature. As is clear from the table, the weight loss increases with increasing mass temperature.

TABLE 2

| Mass temperature | Example 8 - % weight loss |
|---|---|
| 230 | 16.5 |
| 260 | 26.4 |
| 280 | 32.2 |
| 300 | 35.4 |
| 330 | 40.4 |

Table 3 shows the correlation between the percentage of weight loss of the starting composition during the torrefaction process and the residence time at a temperature of 300° C. From this table, it becomes clear that with increasing residence time, the percentage of weight loss increases.

It should be noted that weight loss is advantageous as soon as the weight that is lost originates from water and low-caloric compounds. As a result of this, namely, the percentage of high-caloric compounds in the solid fuel increases and with that, the energy density as well. However, as soon as also high-caloric compounds are lost, no increase in energy density will be observed and in fact, combustion of solid fuel occurs, which is undesired. Therefore, the quantity of weight loss should be selected appropriately depending on inter alia the composition of the starting composition.

TABLE 3

| Residence time | Weight example 8 |
|---|---|
| 5 | 20 |
| 10 | 25 |
| 15 | 30 |
| 30 | 33 |
| 45 | 35.4 |

The percentage of weight loss is partially determined by the size of the granulate (better heat conduction at smaller sizes) and process conditions (they influence the heat transfer).

Table 4 and FIG. 1 show an example of a temperature profile of the mass temperature during the present torrefaction treatment.

TABLE 4

| Time (min) | Mass temperature ° C. |
|---|---|
| 5 | 22 |
| 10 | 70 |
| 15 | 150 |
| 20 | 264 |

TABLE 4-continued

| Time (min) | Mass temperature ° C. |
|---|---|
| 25 | 323 |
| 30 | 335 |
| 35 | 336 |
| 40 | 333 |
| 45 | 333 |
| 50 | 331 |
| 55 | 331 |
| 60 | 331 |
| 65 | 291 |
| 70 | 225 |
| 75 | 176 |
| 80 | 141 |
| 85 | 116 |
| 90 | 97 |
| 95 | 82 |
| 100 | 70 |

DESCRIPTION OF A PREFERRED EMBODIMENT OF THE INVENTION

In a preferred embodiment of the present invention, the following method consists of four major processing steps, namely I) the pretreatment and/or mixing of the raw materials; II) the torrefaction process; III) refining; and IV) the chlorination.

Step I) the Pretreatment and/or Mixing of the Raw Materials

For the production of the present solid fuel, a mixture of different types of SRF of biomass may be used. Based on a defined acceptance investigation, the chemical and physical properties of the possibly qualifying SRF and impure biomass streams are investigated, recorded and assessed for usability as raw material. As the targeted quality and composition of the resulting solid fuel are defined, the raw material composition can be determined with the aid of a recipe calculation. In this way a raw materials requirement of approx. 35,000 t/a (tonnes per year) (calculated for 100% dry matter) SRF/impure biomass will be met. In addition, approx. 5,000 t/a pure biomass can be used as an enriching component to be able to guarantee the defined biogenic content. The supplied SRF streams are supplied to a storage facility and subjected to a strictly determined entry check. After approval, a "release for processing". The result of this entry quality is that a relatively large quantity of SRF (1,500-2,000 tonnes) must always be kept in stock to guarantee the continuity of the process. To the end that no biological activity in the SRF will develop and, thereby, odour nuisance, an acceptance criterion of <15% moisture is used. By using a closed yet ventilated storage facility, access of moisture to the raw materials is prevented. With the aid of a wheeled loading shovel, provided with a positive pressure cab with dust filter system, the raw material is mixed and brought to a dosage bunker.

Step II) the Torrefaction Process

From the dosage bunker, the raw material mixture is led to an entry sluice of the torrefaction reactor, with the aid of a closed belt with adjustable speed. The entry sluice is provided with two gas-tight valves, that alternately open and close in such a manner that one of them is always closed. This prevents that undesired gases exit from the reactor, but even more importantly, that no oxygen accesses the reactor. The reactor is a revolving drum oven (diameter 2.5 m; length 18 meters) that is run under oxygen-poor conditions at a temperature of 260-300° C. and at an uptake capacity of approximately five tonnes of raw material per hour.

During the torrefaction in the revolving drum, gaseous flammable components are formed, which exit as combustion gas via extraction. Said gases are fed into the reactor along with the other materials. As a result of the extraction, a slight underpressure is maintained in the reactor. Undesired exiting of gas is thereby prevented. Possible guide vanes placed on the inside of the drum (inserts) ensure a controlled movement and mixing of the raw materials through the reactor. A degree of filling of approx. 15-20% is maintained by the presence of a dam ring at the end of the revolving drum. The rotation rate of the revolving drum is controllable and thereby, the processing rate and residence time. The flammable gases released during the process are loaded with hydrochloric acid, originating from chlorine-containing plastics and $SO_2/SO_3$ that are present. They are removed from the combustion gas by means of a ceramic dust filter by addition of sodium bicarbonate ($NaHCO_3$) or another reagent, then led to the after-burner and combusted at approximately 1000-1100° C. (residence time 2 sec.>850° C.) for the sake of energy recovery in the system. Another filter material that is resistant to temperatures of up to 350° C. may also be used. The salts released from ceramic filter are led away for further processing. The treatment of the combustion gases results in the development of relatively clean flue gases in the after-burner. The removal of possibly present chlorine, dust and the very high combustion temperature of the combustion gas ensure that no measures to reduce the level of dioxins and dibenzofuranes are necessary.

Of importance with regard to the ceramic filter is that no so-called "condensables" are present in the hot combustion gases. This means that the temperature path of the torrefaction is limited. The temperature must be high enough to achieve the targeted mechanical effects and targeted quantitative cracking of the chlorine-containing polymers. The temperature, however, should not be too high in connection with the formation of the secondary tars and other condensables. This means that the process has a narrow temperature window, as already explained before. The ideal temperature window lies between 250-350° C., notably 280-300° C.

Course of the Torrefaction Process

The flue gases obtained from the after-burner partially are led to the compartmentalised outer mantle of the revolving drum. These flue gases heat the raw materials indirectly to a mass temperature of 100° C. as a result of which the raw material is dried. As a result of the increasing mass temperature, the plastic that is present softens, enters the adhesion phase and granulates, also as a result of the fine biogenic particles that are present. The mass temperature gradually increases further to 260-350° C. and carbonisation takes place. Here, flammable gases are formed as a result of partial degradation of the present organic compounds, which as mentioned are sent to the after-burner at a temperature of approx. 260-350° C. The flue gases exit the outer wall of the revolving drum at a temperature of approx. 650° C. and are mixed with the remaining hot flue gases. The formed solid fuel is subsequently indirectly cooled to <100° C. in the cooler with the aid of the fresh combustion air extracted from the storage facility. In this cooler, which is also embodied as a revolving drum, the raw solid fuel is separated into a fraction>10 mm and a fraction<10 mm. The fraction>10 mm may consist of still partly plastic granules. Depending on the quality and quantity, said granules may be crushed and be supplied to the process again or discharged as waste for processing (cement plant).

Step III) Refining

The fraction<10 mm is led to the refining by means of an overbelt magnet. In this module, the granules of the solid fuel are crushed with the aid of roll crushers and screened into fractions:

fraction>3 mm. This consists of plastic parts, mainly aluminium. This fraction is led away for the purpose of recovery of aluminium.

fraction<3 mm which is purified further. The refining unit is realized as a closed unit and provided with an exhaust extraction. The extracted air is brought to the after-burner.

Step IV) the Chlorination

The fraction<3 mm is led to a soaking tank. In said soaking tank, the size-reduced solid fuel is contacted with process water (contact time approx. 1 hour) and then pumped as a slurry (70% process water) to a vacuum band. On the vacuum band, the slurry dewatered, washed in a multiple-step counter-stream washing and subsequently again maximally dewatered with the aid of vacuum dewatering. The dewatered solid fuel with a dry-matter content of approx. 70% is subsequently brought to a drying device. This drying device is realized as an indirectly heated unit. The solid fuel is dried to a dry-matter content of approx. 95% and cooled to <60° C. Subsequently, the obtained solid fuel is led to the storage silos.

A number of auxiliary processes occurs in the process, such as a) salt production, b) flue gas treatment, and c) heat recovery.

a) Salt Production

The upstream water originating from the soaking tank is led away to the spray dryer. This water contains a mixture of salts of alkali metals and earth alkali metals (notably chlorides and sulfates) as well as organic soluble components. The spray dryer is fed with hot flue gases, originating from the after-burner or from the torrefaction reactor. The vapours released during evaporation are brought to the after-burner as ballast gases. The crystallised salts are led from the spray dryer to a storage silo or container and from there led away for further processing.

b) Flue Gas Treatment

The flue gases, originating from the after-burner and from the torrefaction reactor, are led over the heat exchanger. The led-through flue gases are cooled to <280° C. and led away to the chimney (minimum height 35 m) by means of the dry flue gas treatment and the suction ventilator, the European emission standards being met. The flue gas treatment is actually intended as check filter against emission of mercury compounds possibly present in the SRF. It consists of a so-called "sleeve filter" or "bag filter", which by blowing in of adsorption means, for example a mixture of sodium bicarbonate/active coal, is loaded by an adsorption layer for the possibly still present hazardous components. By this process choice, also the potential risk of emission of aerosols and fine dust is prevented. The suction ventilator controls the necessary underpressure in the entire installation. The flue gas treatment residue is led away for further processing.

c) Heat Recovery

The heat released in the heat exchanger/vessel is transferred to the indirect drying device with the aid of thermo oil at a temperature of maximally 260° C. This indirect drying device is operated under a slight underpressure. The water vapour released from the drying device is precipitated in the condenser. The condensed water released here is led back into the washing process. The compounds that are released in the condenser but cannot be condensed, are also led away to the after-burner. The thermo oil from heat exchanger/vessel is led in a cycle with the drying device.

Table 5 below shows examples of certain characteristics of the present process.

TABLE 5

|  | Quantity | Unit |
|---|---|---|
| Raw material quantity SRF | 35000 | tonnes/a (dry matter) |
| Raw material quantity biomass | 5000 | tonnes/a |
| Moisture content | <15 | % |
| Inert materials | <2 | % |
| Chlorine content | <2 | % |
| Revolving drum length | 18 | metre |
| Revolving drum diameter | 2.5 | metre |
| Degree of filling | 15 | % |
| Residence time at desired mass temperature | 30 | minute |
| Temperature after-burner | 1,050-1,100 | ° C. |
| Percentage oxygen ($O_2$) | 3 | % |
| Mass temperature | 260-340 | ° C. |
| Wall temperature | >600 | ° C. |
| Flue gas temperature entry | >1,000 | ° C. |
| Flue gas temperature exit | approx. 650 | ° C. |
| Combustion gas temperature exit | approx. 260-340 | ° C. |

In Table 6, hereafter, examples are mentioned of certain characteristics of a solid fuel according to the present invention, which has been subjected to the method for the removal of one or more metals as well as to the method for the reduction of the chlorine content.

TABLE 6

| Caloric value | >20 Mj/kg |
|---|---|
| Moisture content | <5% |
| Particle size | <3 mm |
| Cl content | <0.2% |
| S content | <0.5% |
| Bulk weight | >0.4 t/m$^3$ (= 400 g/l) |
| % biomass | >50% |

Example 10

A solid fuel was obtained by torrefaction of 100 wt. % Trockenstabilat (brand) having a particle size of 10 mm washed with water. The measurement of the "total chlorine content" before and after the washing was carried out. The results are shown in Table 7.

Example 11

A solid fuel according to example 10 was treated to reduce the particle size to 4 mm. Subsequently, the solid fuel was treated the same way as in Example 10. The results are shown in Table 7.

TABLE 7

| Example | "total chlorine content" before washing (mg/kg solid matter) | "total chlorine content" after washing (mg/kg solid matter) |
|---|---|---|
| Example 10 | 16100 | 2100 |
| Example 11 | 12400 | 300 |

From the table, it is clear that the present method can be applied for the reduction of the "total chlorine content" of a torrefied solid fuel. The "total chlorine content" can be reduced by as much as 95-99%.

The invention claimed is:

1. A method for the reduction of the total chlorine content of a torrefied solid fuel, which solid fuel is obtained from a starting composition wherein a secondary recovered fuel material is present, wherein the starting composition is heated at a mass temperature of approximately 150° C. to approximately 360° C., and wherein the solid fuel is thereafter washed with a solvent, in which solvent chlorine compounds present in the solid fuel dissolve.

2. A method according to claim 1, wherein the solvent is an aqueous solvent.

3. A method according to claim 1, wherein the solid fuel is washed immediately after the torrefaction of the starting composition, while the mass temperature of the torrefied solid fuel is 150-360° C.

4. A method according to claim 1, wherein the solvent is heated to a temperature of 30-100° C. before being used for washing the solid fuel.

5. A method according to claim 1, comprising an additional step of washing, which additional step is carried out on the washed solid fuel.

6. A method according to claim 1, wherein the solid fuel is quenched with the solvent immediately after the torrefaction of the starting composition, after which the solid fuel moistened with solvent is washed with additional solvent in counter-flow.

7. A method according to claim 1, the method comprising an additional step after the washing of the solid fuel with the solvent, said additional step comprising the drying of the solid fuel moistened with solvent.

8. A method according to claim 1, the method comprising an additional step of reducing the solid fuel to a particle size of between 0.5 mm and 5 mm, the step being carried out prior to the washing of the solid fuel with the solvent.

9. A purified solid fuel obtained by the method according to claim 1.

10. A solid fuel according to claim 9, wherein the fuel is in the form of a granulate, with a granulate size less than 40 mm.

11. A solid fuel according to claim 10, wherein the fuel is in the form of a granulate, with the granulate size less than 10 mm.

12. A solid fuel according to claim 9, wherein 40 to 90 wt. % torrefied biomass, based on the dry weight of the solid fuel, is present in the solid fuel.

13. A solid fuel according to claim 9, wherein 10 to 60 wt. % torrefied plastics, based on the dry weight of the solid fuel, is present in the solid fuel.

14. A solid fuel according to claim 9, wherein torrefied biomass and torrefied plastics are present in the solid fuel, wherein at least 40 wt. % of the torrefied biomass is embedded in the torrefied plastics.

15. A solid fuel according to claim 9, wherein maximally 5 wt. % contaminants, based on the dry weight of the solid fuel, is present in the solid fuel.

16. A solid fuel according to claim 9, wherein less than 5 wt. % water, based on the total weight of the solid fuel, is present in the solid fuel.

17. A fuel for a coal-fired power plant which comprises a solid fuel according to claim 9.

18. A method according to claim 1 wherein the starting composition is heated indirectly.

19. A method according to claim 2, wherein the solvent is water.

20. A method according to claim 2, wherein the solvent is an aqueous solution of one or more compounds which increase the water solubility of the chlorine compounds.

21. A solid fuel according to claim 9, wherein the total chlorine content is maximally 0.5 wt. %, based on the dry weight of the purified solid fuel.

\* \* \* \* \*